United States Patent [19]
Zievers et al.

[11] Patent Number: 5,152,815
[45] Date of Patent: Oct. 6, 1992

[54] TYPE 114 TIERED FILTER

[76] Inventors: James F. Zievers, 1240 Carriage La., LaGrange, Ill. 60525; Paul Eggerstedt, 2524 Westover Ave., North Riverside, Ill. 60546; Elmer Kulousek, 2323 S. Highland, Berwyn, Ill. 60502

[21] Appl. No.: 402,562

[22] Filed: Sep. 5, 1989

[51] Int. Cl.⁵ .......................................... B01D 46/24
[52] U.S. Cl. .................................... 55/341.1; 55/374; 55/378; 55/523; 210/323.2; 210/510.1
[58] Field of Search ............... 55/341.1, 341.5, 374, 55/375, 378, 523; 210/323.2, 346, 347, 510.1

[56] References Cited

U.S. PATENT DOCUMENTS

| | | | |
|---|---|---|---|
| 602,304 | 4/1898 | Chamberland | 210/323.2 |
| 2,301,430 | 11/1942 | Malanowski | 210/323.2 X |
| 3,112,776 | 12/1963 | Riley | 55/341.1 X |
| 3,385,672 | 5/1968 | McGoff et al. | 55/341.1 X |
| 3,615,256 | 10/1971 | Miller et al. | 55/341.1 X |
| 4,163,724 | 8/1979 | Müller et al. | 210/323.2 |
| 4,289,630 | 9/1981 | Schmidt, Jr. et al. | 210/323.2 X |
| 4,343,631 | 8/1982 | Ciliberti | 55/523 X |
| 4,439,327 | 3/1984 | Müller | 210/323.2 X |
| 4,511,471 | 4/1985 | Müller | 210/323.2 |
| 4,525,184 | 6/1985 | Tassicker | 55/341.1 X |
| 4,526,688 | 7/1985 | Schmidt, Jr. et al. | 210/323.2 |
| 4,591,446 | 5/1986 | Müller | 210/323.2 X |
| 4,592,847 | 6/1986 | Schumacher | 210/323.2 X |
| 4,704,210 | 11/1987 | Boze et al. | 210/323.2 X |
| 4,713,174 | 12/1987 | Zievers et al. | 210/323.2 X |
| 4,728,423 | 3/1988 | Kuwajima | 210/323.2 |
| 4,737,176 | 4/1988 | Lippert et al. | 55/523 X |
| 4,786,408 | 11/1988 | Sahara et al. | 210/323.2 X |

FOREIGN PATENT DOCUMENTS

| | | | |
|---|---|---|---|
| 3519484 | 11/1986 | Fed. Rep. of Germany | 210/323.2 |
| 2598093 | 11/1987 | France | 210/323.2 |

Primary Examiner—Robert Spitzer
Attorney, Agent, or Firm—Edmond T. Patnaude

[57] ABSTRACT

A pressure filter includes a filter tank into which a rigid outlet conduit extends, and a plurality of clusters of filter tubes are suspended in the pressure chamber within the tank from a multi-tube manifold which is connected to and hangs from the outlet conduit. In the disclosed embodiment a purality of outlet conduits and associated manifolds and filter tubes are disposed within a single filter tank.

6 Claims, 2 Drawing Sheets

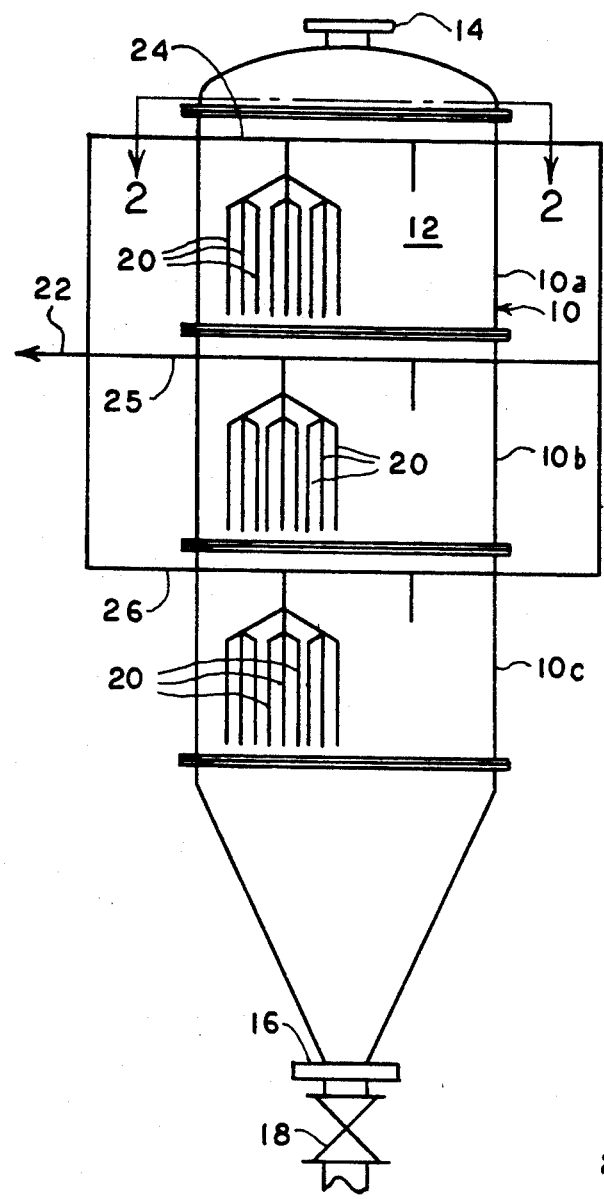
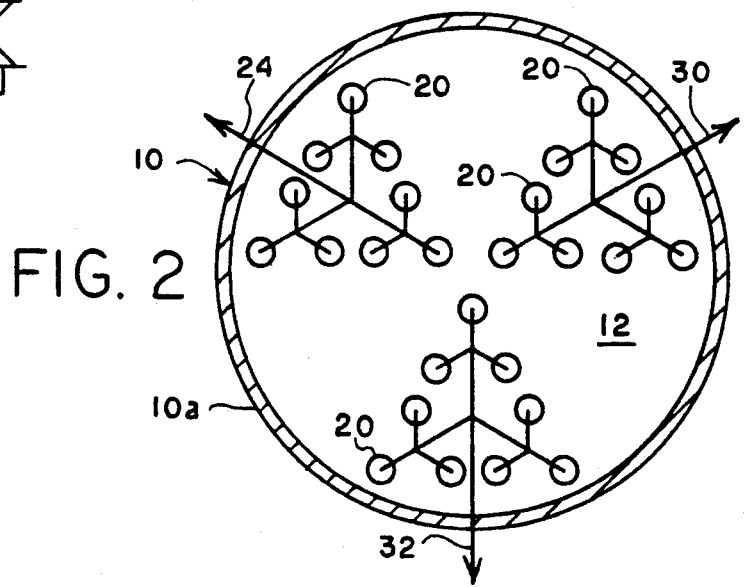
FIG. 1
FIG. 2

TYPE 114 TIERED FILTER

The present invention relates in general to pressure filter systems, and it relates more particularly to a new and improved filter for removing entrained particulates from hot gasses which pass through the filter.

BACKGROUND OF THE INVENTION

Filters using ceramic filter elements in the form of tubes or candles generally include a sealed tank enclosing a filter chamber and a plurality of filter elements which extend through a tube sheet which supports the filter elements within the filter chamber and seal the inlet side of the filter elements from the outlet side. When temperatures of 1200 degrees F. or more are involved, the tube sheet must be relatively thick and massive so as to retain its original shape during the filter operation. Moreover, since the filter elements extend through respective holes in the tube sheet, as the number of filter elements used is increased the thickness and bulk of the tube sheet must also be increased. Consequently, it becomes difficult to increase the filter surface area in a given size filter tank using prior art techniques.

SUMMARY OF THE INVENTION

Briefly, there is provided in accordance with the present invention a novel filter wherein a plurality of filter tubes or candles are suspended from a manifold which in turn is suspended from a rigid outlet conduit mounted to the filter tank. This filter construction enables a substantial increase in the number of filter tubes and thus in the active filte surface area in a given size filter tank.

In accordance with another aspect of the invention there is provided a new and improved method and system for removably mounting ceramic or other filter elements to a manifold.

GENERAL DESCRIPTION OF THE DRAWINGS

Further objects and advantages and a better understanding of the present invention will be had by reference to the following detailed description taken in connection with the accompanying drawings wherein:

FIG. 1 is a schematic elevational view of a high temperature pressure filter embodying the present invention:

FIG. 2 is a horizontal cross-sectional view of the filter of FIG. 1 taken along the line 2—2 thereof;

DETAILED DESCRIPTION OF A PREFERRED EMBODIMENT OF THE INVENTION

Figure 3:
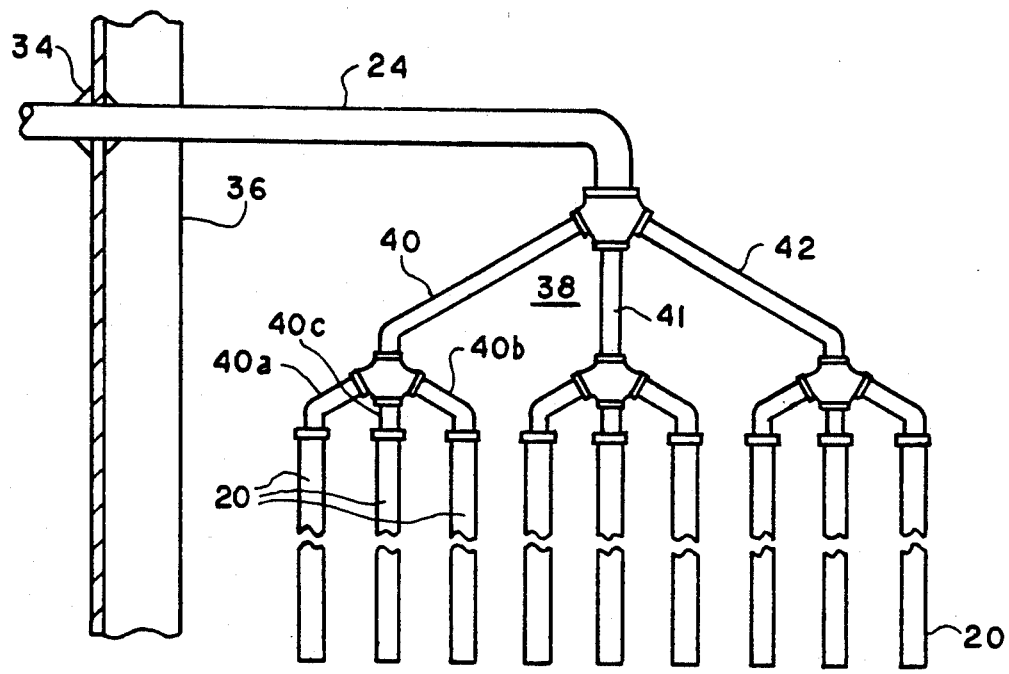
FIG. 3 is a fragmentary view, partly schematic, showing the manner in which a plurality of filter elements and an associated manifold are mounted to an associated outlet conduit.

Referring particularly to FIGS. 1 and 2, there is shown filter 10 which encloses a pressurizable chamber 12. The filter 10 in specially designed for the filtration of hot flue gasses or the like where the temperature of the gas is commonly above 1200 degrees F. It will be understood, however, that the invention has application for filtering other fluids and at lower temperature.

An inlet port 14 is provided at the top of the tank and a dust outlet port 16 is provided at the bottom of the tank. A valve 18 is connected over the dust outlet 16 and is opened periodically to remove dust which collects at the bottom of the tank. A plurality of tubular filter elements 20 are mounted within the chamber 12 and the inner chambers of the filter tubes are connected to a gas outlet 22. The filter tubes 20 are conventional in construction and include a porous cylindrical section through which the fluid to be filtered passes and on the outer surface of which entrained particles in the fluid are captured and provide a filter cake on the outer surface of the filter tubes. The filter tubes described in applicant's copending application, Ser. No. 07/377,228 filed July 10, 1989, now U.S. Pat. No. 4,968,467. Periodically the filter cakes are dislodged from the filter elements 20 and drop to the conical bottom section of the filter tank from which they are removed when the valve 18 is opened.

With reference to FIG. 1, it will be seen that a cluster of nine filter tubes 20 are arranged in subclusters of three which are supported by a rigid outlet conduit 24 which extends through the side wall of the filter tank 10 and is affixed thereto as by weldments. Two additional outlet conduits 26 and 28 are provided one above the other and they in turn each support a cluster of nine filter tubes. Additional conduits and associated clusters of filter tubes are provided, but they are not illustrated in FIG. 1 for purposes of clarity. In FIG. 2, it may been that there are provided three outlet conduits 24, 30 and 32 which respectively support a cluster of filter tubes made up of three sets of three. Consequently, the filter tank 10 is constituted by a plurality of cylindrical sections 10a, 10b, and 10c which are sealably and removably connected together to permit repair and replacement of the filter tubes 20 when necessary.

Referring to FIG. 3, it may be seen that the outlet conduit 24, which is a rigid metal pipe, extends through a hole in the side wall of the filter tank and is welded thereto at 34. The filter tank is metal and includes a refractory liner 36. The outlet conduit 24 has a 90 degree bend near the inner end and is connected at its lower end to a manifold 38 which is made up of three metal tubular sections 40, 41 and 42 to the bottom distal ends of which three additional metal tubular sections are connected. The filter elements 20 are sealably connected to the loer end of these latter tubular sections and are solely supported by them.

Figure 4:
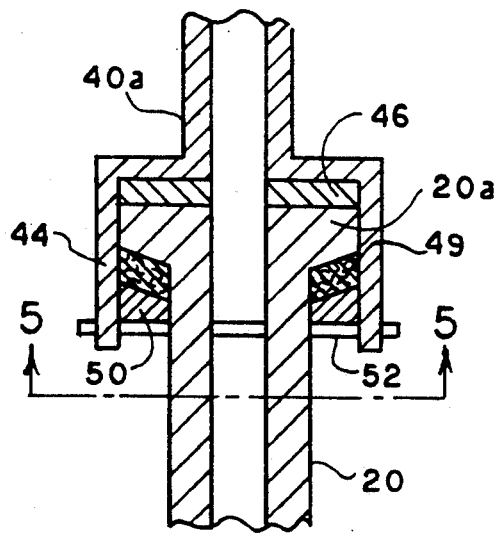
FIG. 4 is a vertical cross-sectional view showing the manner in which one of the filter elements is mounted to the manifold.
Figure 5:
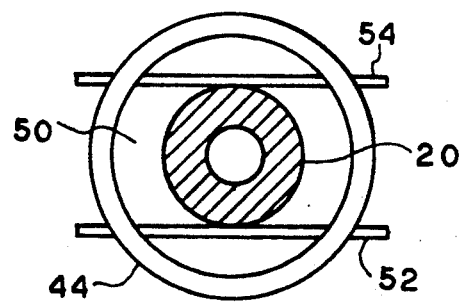
FIG. 5 is a horizontal cross-sectional view taken along the line 5—5 of FIG. 4.

Referring to FIG. 4, it may be seen that the lower end of each manifold tubular section 40a is provided with a depending cylindrical connector section 44 which has a circular opening at the bottom into which the upper end of a filter element 20 extends. The filter element 20 is of the conventional construction for ceramic gas filter tubes and includes an external annular flange 20a at the top. A flat annular sealing gasket is provided over the top of the upper end of the tube 20 and an annular sealing gasket 49 surrounds the body of the filter element. A metal ring 50 surrounds the body of the filter tube 20 below the gasket 49 and a pair of rigid rods 52 and 54 extend through mutually aligned openings near the lower and of the connector tube 44 as shown in FIG. 5 so as to extend along the sides of the body section of the filter 20 just below the ring 50, thereby to support the filter tube 20. The parts are dimensioned such that the gaskets 46 and 49 are held in compression to provide a pair of seals which prevent the fluid in the chamber 12 from bypassing the filter elements 20 and flowing directly into the manifold conduits.

While the present invention has been described in connection with particular embodiments thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed:

1. Filtration apparatus, comprising in combination
    a tank enclosing a pressurizable filter chamber,
    a rigid fluid outlet conduit mounted to said tank and at least partially extending into said chamber,
    a first plurality of rigid tubes depending from said outlet conduit and disposed within said chamber,
    a second plurality of rigid tubes arranged in sets with the tubes in the respective sets being connected to and depending from one of said first plurality of rigid tubes,
    a plurality of filter elements connected to and supported by a respective one of said second plurality of rigid tubes,
    whereby said filter elements are connected to and supported by said outlet by said pluralities of rigid tubes.

2. Filtration apparatus according to claim 1, further comprising
    said second plurality of rigid tubes having respective lower ends provided with a recess,
    said filter elements having tubular upper end portions respectively extending upwardly into said recesses,
    a plurality of annular gaskets positioned between the upper ends of said tubular upper end portions and said second pluraltiy of rigid tubes, and
    releasable locking means securing said upper end portions of said filter elements to said second plurality of rigid tubes.

3. Filtration apparatus comprising in combination
    a tank enclosing a pressurizable filter chamber,
    a fluid outlet conduit mounted to said tank and at least partially disposed within said tank,
    a plurality of filter elements each having an inner chamber and a porous filter medium positioned between said filter chamber and said inner chamber,
    manifold means interposed between said outlet conduit and said filter elements,
    said manifold means having a plurality of downwardly opening recesses therein,
    said filter elements respectively having tubular upper end portions extending into said recesses,
    a plurality of annular sealing gaskets positioned between the upper ends of said tubular upper end portions and said manifold means,
    said filter elements respectively having external annular flanges on said upper end portions disposed in said recesses, and
    a plurality of rods extending through mutually aligned openings in said manifold alongside said upper portions of said upper end portions beneath said flanges,
    said rod supporting said filter elements and holding said upper end portions of said filter elements in sealing relationship with said gaskets.

4. Filtration apparatus according to claim 3, comprising
    a rigid ring disposed between said rod and said flange.

5. Filtration apparatus according to claim 4, comprising
    an annular resilient sealing gasket disposed between said ring and said flange.

6. Filtration apparatus, comprising in combination
    a tank enclosing a pressurizable filter chamber,
    a rigid fluid outlet conduit mounted to said tank and at least partially extending into said chamber,
    a first plurality of rigid tubes depending from said outlet conduit and disposed within said chamber,
    a second plurality of rigid tubes arranged in sets with the tubes in the respective sets being connected to and depending from one of said first plurality of rigid tubes,
    a plurality of filter elements connected to and supported by a respective one of said second pluratiy of rigid tubes,
    said second plurality of rigid tubes having respective lower ends provided with a recess,
    said filter elements having tubular upper end portions respectively extending upwardly into said recesses,
    a plurality of annular gaskets positioned between the upper ends of said tubular upper end portions and said second plurality of rigid tubes,
    a rod extending through aligned openings in the associated one of said second plurality of tubes,
    said rod extending through said recess in the associated one of said second plurality of rigid tubes, and
    an external annular flange provided at the upper end of the associated one of said filter elements and disposed above the associated rod with said flange resting on and supported by said rod.

* * * * *